March 24, 1959 C. B. KEYES 2,878,948
PALLET LOADING APPARATUS
Filed Oct. 20, 1955 5 Sheets-Sheet 1

Inventor
Clifford B. Keyes
by Rowland V. Patrick,
Atty.

March 24, 1959

C. B. KEYES 2,878,948

PALLET LOADING APPARATUS

Filed Oct. 20, 1955

Inventor
Clifford B. Keyes
by Rowland V. Patrick
Atty.

March 24, 1959 C. B. KEYES 2,878,948
PALLET LOADING APPARATUS
Filed Oct. 20, 1955 5 Sheets-Sheet 3
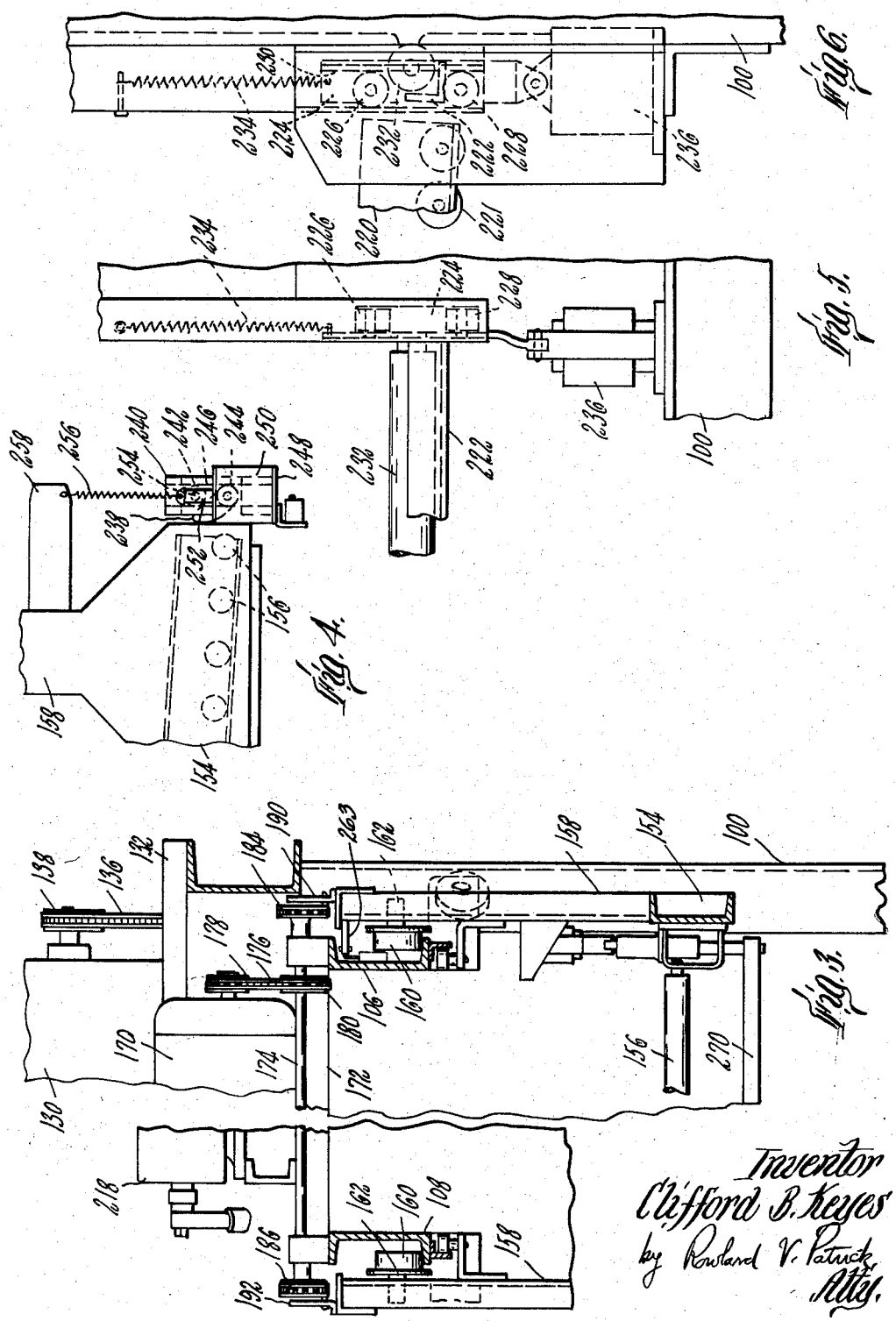
Inventor
Clifford B. Keyes
by Rowland V. Patrick
Atty.

March 24, 1959     C. B. KEYES     2,878,948
PALLET LOADING APPARATUS
Filed Oct. 20, 1955     5 Sheets-Sheet 4
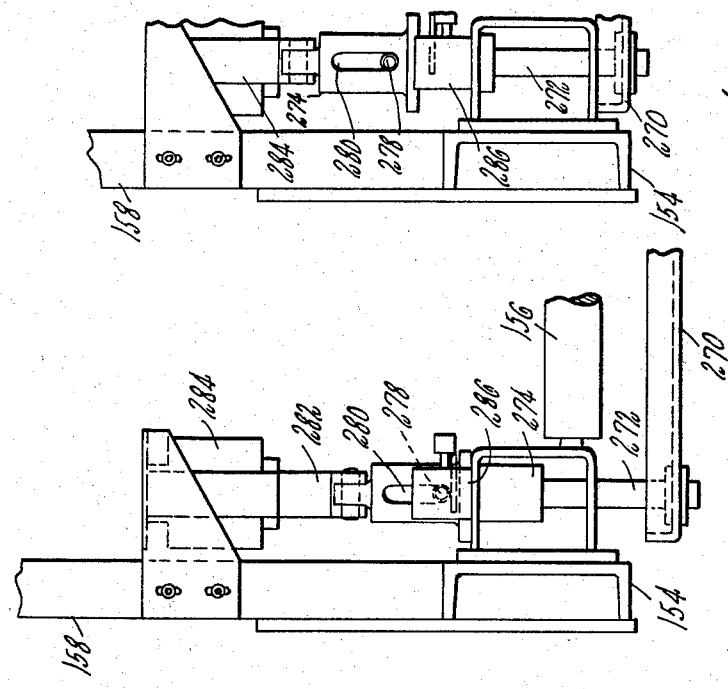
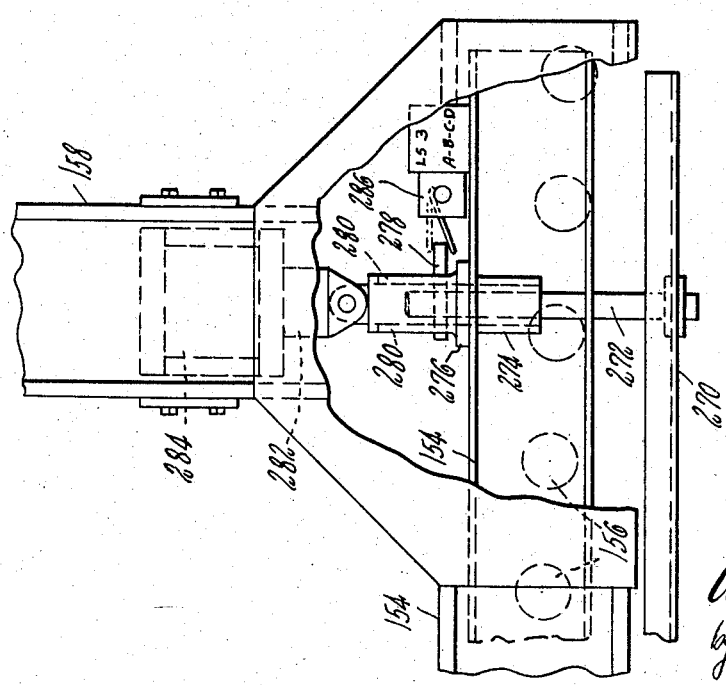
Inventor
Clifford B. Keyes
by Rowland V. Patrick
Atty.

United States Patent Office 2,878,948
Patented Mar. 24, 1959

2,878,948

PALLET LOADING APPARATUS

Clifford B. Keyes, Arlington, Mass., assignor to J. W. Greer Company, Wilmington, Mass., a corporation of Massachusetts Application October 20, 1955, Serial No. 541,652

8 Claims. (Cl. 214—6)

The present invention relates to material handling apparatus, and more particularly to a pallet loading apparatus.

The invention is herein disclosed as embodied in a material loading apparatus of the general type which is supplied by a conveyor on which packages or similar units are moved in groups to a loading station and are then stacked in tiers on a pallet or other support provided for this purpose.

It is a principal object of the present invention to provide a material loading apparatus which is constructed and arranged for the loading of multi-unit tiers onto a pallet or other support provided for this purpose from a loading conveyor which delivers successive multi-unit layers to the machine at a level substantially above the highest tier of the multi-unit layer of the stack deposited on the pallet, so that the loaded elevator is required to move only in a downward direction thereby substantially reducing the power required for the transfer of each successive multi-unit layer to its tiered position in the stack.

It is another object of the invention to provide in a power loading mechanism of the general description having as parts thereof an elevator, a laterally displaceable carriage having a roller platform on which the multi-unit layer is received from the supply conveyor, a stripping device for stripping successive multi-unit layers from the platform in tiered position, and power operated devices for operating each of the elevator, platform, and stripping device, a novel and improved sensing device which will detect the presence of an obstruction below the downwardly moving elevator and loaded platform and will cause the downward movement of said parts to be arrested in position for the stripping of each succeeding multi-unit layer onto the pallet or onto a previously tiered unit-layer in a properly stacked position.

In carrying out the present invention, a pallet loading apparatus is provided which takes the form generally of a vertically disposed frame having mounted therein an elevator which in turn provides support for a carriage having a roller platform and is shiftable on the elevator in a transverse direction between a package unloading position overlying a pallet or other support on which the packages are to be tiered and a platform loading position adjacent the loading conveyor.

Packages are supplied to the carriage platform when the elevator is in its uppermost position and at a level substantially above the level of the fully stacked pallet load. The carriage is then shifted transversely to a position over the pallet, and the elevator is caused to move downwardly preparatory for stripping the multi-unit layer packages onto the pallet, or onto the topmost tier of packages already stacked thereon.

In accordance with a feature of the invention a sensing plate mounted below and in close proximity to the carriage platform operates to detect the presence of any obstruction therebeneath, and thereupon to arrest the downward movement of the elevator in the package discharge position. The carriage and the platform are then moved laterally from their position overlying the tiered stack while at the same time the package stripper mounted on the elevator is rendered operative to strip packages from the laterally displaced platform.

An important feature of the illustrated construction consists in the construction and arrangement of the elevator and the platform supporting carriage whereby the elevator is loaded in its extreme high position and is caused to move downwardly to each of the series of loading positions in which successive tiers of boxes are stripped from the platform and are stacked in successively formed tiers on the pallet. This construction has a number of important advantages including compactness and economy of operation, since the weight of the packages is utilized positively to assist in the packaging operation, and sufficient power is required only to return the unloaded elevator and platform supporting carriage to their raised loading position.

Another feature of the invention consists in the provision of the sensing plate above referred to, which entirely fills the area immediately beneath the carriage platform, and is so supported that the engagement of any obstruction therewith, and the consequent upward pressure on the sensing plate during the downward movement of the elevator and platform supporting carriage therewith, is effective to arrest the downward movement of these parts in position for the stripping of the next succeeding multi-unit layer from the platform onto the stack. The sensing plate, being mounted as a unit with the carriage, is moved transversely therewith from its position over the stack as the packages are stripped from the platform.

With the above noted and other objects in view as may hereinafter appear, the invention consists also in the devices, combinations and arrangement of parts hereinafter described and claimed, which, together with the advantages to be obtained thereby, will be readily understood by one skilled in the art from the following description taken in connection with the accompanying drawings, in which:

Fig. 3 is a vertical sectional view taken on a line 3—3 of Fig. 1 with the middle portion of the apparatus broken away;

Fig. 4 is a detail view in side elevation taken on a line 4—4 of Fig. 2 illustrating particularly the stop mechanism for the packages at the rear end of the carriage;

Fig. 5 is a fragmentary view in front elevation taken on a line 5—5 of Fig. 1 on a larger scale illustrating a portion of the gate mechanism for controlling the flow of packages from the loading conveyor onto the carriage platform;

Fig. 6 is a view looking from the right of substantially the parts shown in Fig. 5;

Fig. 7 is an enlarged detail view in right side elevation illustrating particularly a portion of the sensing plate and one of the supporting and actuating assemblies;

Fig. 8 is a view looking from the right of substantially the parts shown in Fig. 7 with the sensing plate and with the supporting and actuating assembly therefor in a normally depressed position;

Fig. 9 is a view similar to Fig. 8, but with the sensing plate and its supporting assembly drawn upwardly to its inoperative return position.

The pallet loading apparatus which forms the subject matter of the present invention, is of the general type illustrated and described in the co-pending application of Locke and Convers, Serial No. 445,142, filed July 22, 1954, for Apparatus for Loading Units.

Figure 1:
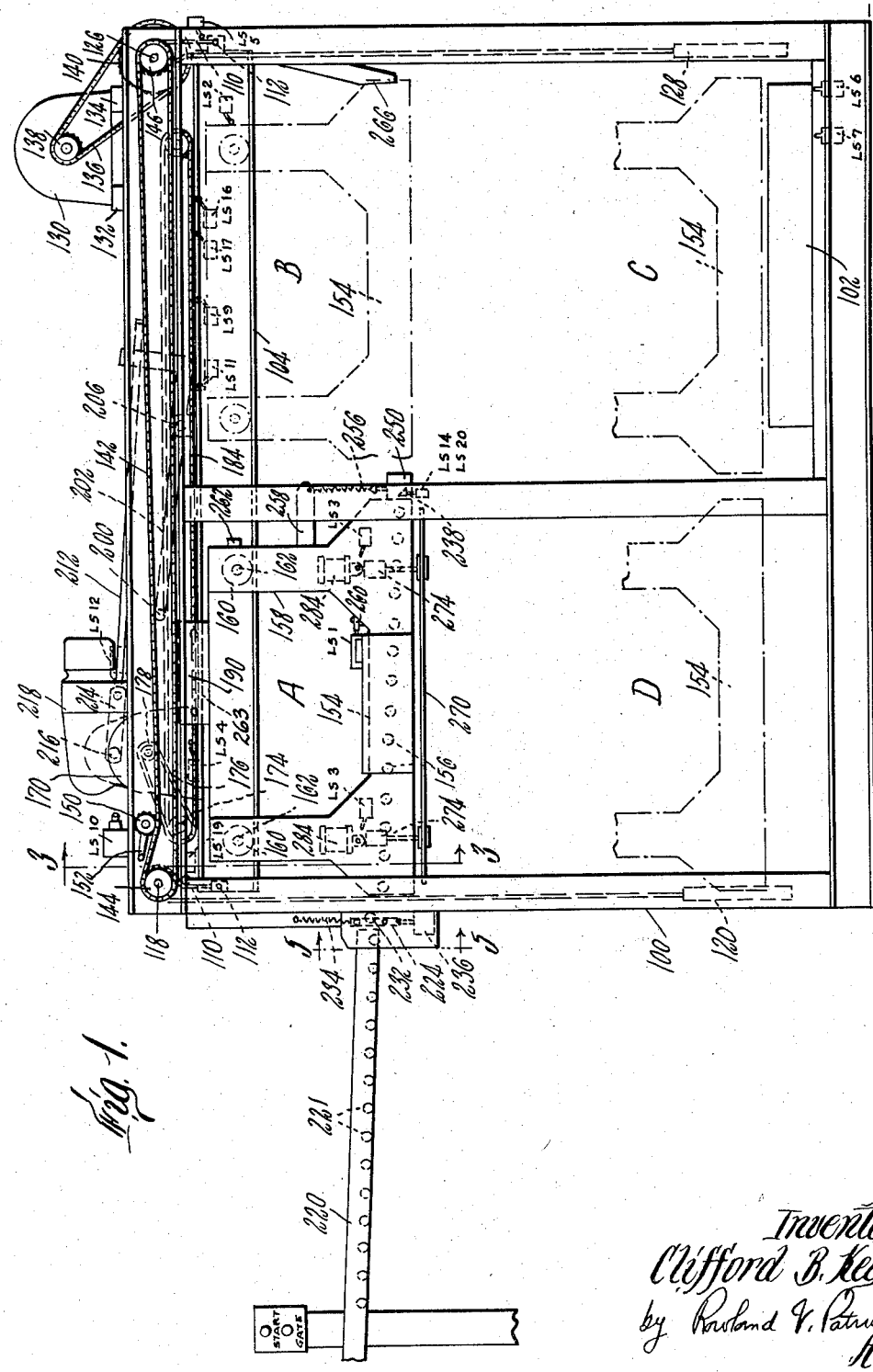
Fig. 1 is a view in right side elevation of the loading apparatus including the supporting frame, elevator and carriage, and also having indicated thereon the supply conveyor and a pallet on which successive tiers of packages or similar units are to be loaded.
Figure 2:
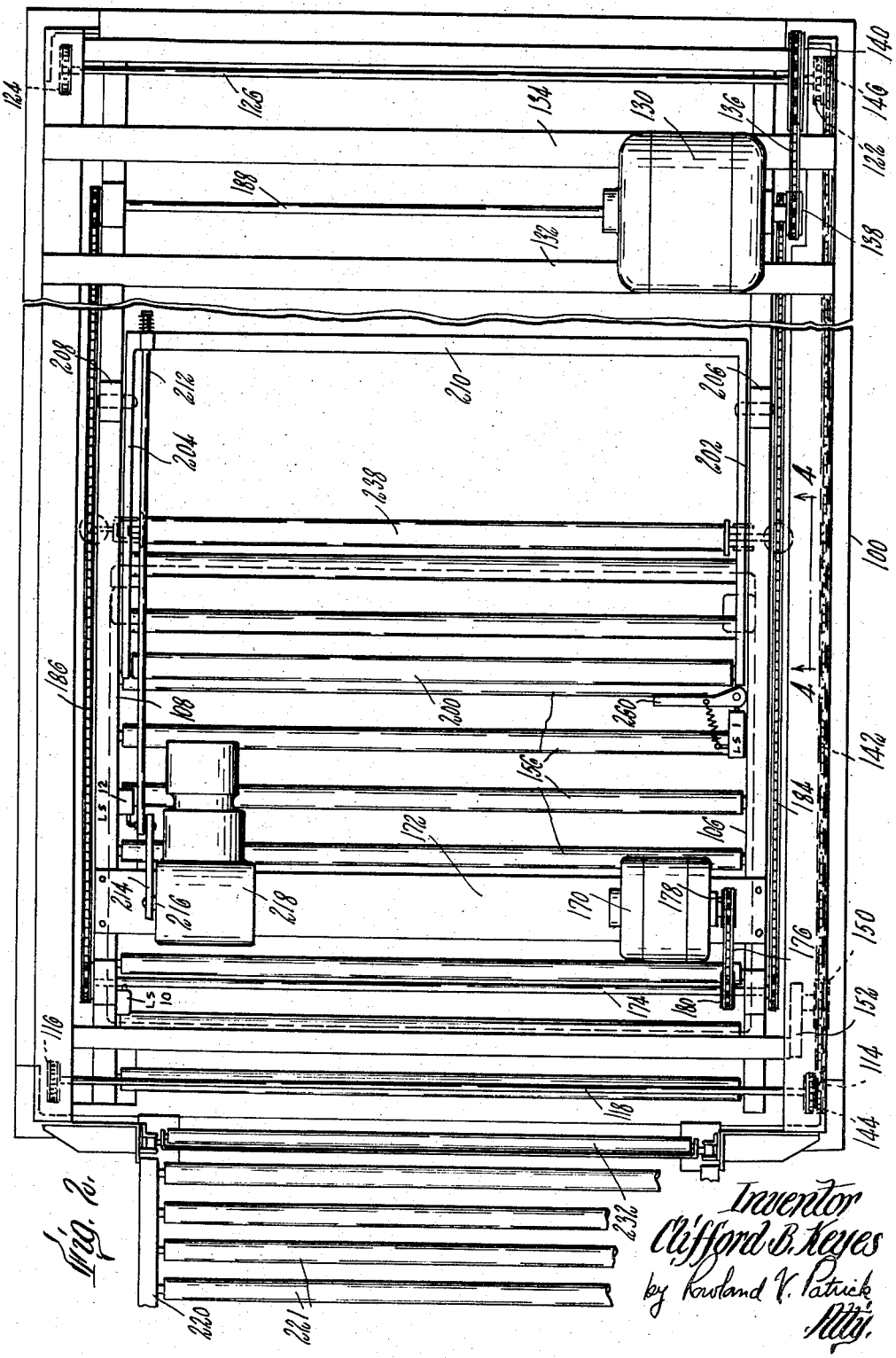
Fig. 2 is a plan view of substantially the parts shown in Fig. 1.

The apparatus herein shown comprises a generally rectangular frame 100 which may be regarded as divided generally in two vertically arranged compartments, the compartment on the right as shown in Fig. 1 providing support at the bottom thereof for a pallet 102, and the compartment at the left being in the nature of a unit-tier receiving compartment for the apparatus. Within the rectangular frame 100 is mounted an elevator 104 which is also rectangular in shape filling substantially the entire area within the frame 100. The elevator consists of two horizontally disposed and spaced apart channel irons 106, 108 which are rigidly connected together by tie members not specifically illustrated. The elevator is supported at each of its four corners by four identical sprocket chains 110, each of which is attached to a lug 112 at the respective ends of the two channel irons 106 and 108. The two sprocket chains 110 at the forward or left hand end of the machine as shown in Figs. 1 and 2 pass around sprockets 114, 116 secured to a cross shaft 118, and thence downwardly to counter-weights 120 guided within the vertical corner posts of the frame 100. The two sprocket chains at the rear or right hand end of the apparatus as shown in Figs. 1 and 2 extend from their respective lugs upwardly over sprockets 122 and 124 mounted at opposite ends of the cross shaft 126, and thence extend downwardly to counter-weights 128 which are guided within the two rear corner uprights of the frame 100.

The operating connections for moving the elevator up and down include an elevator motor 130 mounted on two cross bars 132 and 134 extending across the rear top portion of the frame 100. The motor is connected to drive the rear cross shaft 126 by means of a sprocket chain 136 connected between a sprocket 138 in the armature shaft of the motor and a sprocket 140 on the shaft 126. The sprocket supporting shafts 118 and 126 are driven simultaneously as a unit by means of a connecting endless sprocket chain 142 which is supported at its two ends on sprockets 144 and 146, carried respectively on the sprocket shafts 118 and 126. In order to maintain the sprocket chain 142 in a tightened condition, the chain is arranged to pass beneath an idler sprocket 150 carried on rocker arm 152, as best shown in Fig. 2.

The elevator 104 provides support for a carriage 154 having mounted thereon a roller platform, consisting of rollers 156, which is adapted to receive thereon, and thereafter to discharge onto the pallet 102 successive multi-unit tiers of packages. The carriage 154 consists of a rectangular frame which covers substantially the area taken up by the pallet 102 and is shiftable between two alternative multi-unit receiving and multi-unit discharge positions. To this end the carriage 154 is suspended from vertically disposed arms 158 each of which, at its upper end, carries a roller 160 mounted on a pivot pin 162 on the arm 158 and is adapted to ride within the lower lip of the overlying channel iron 106 or 108. The carriage is moved along the track provided by the channel irons 106, 108 from one to the other of its package receiving and pallet loading positions by means of connections which include a separate carriage motor 170 which is mounted on a cross bar 172 extending between the channel irons 106, 108 of the elevator. The motor 170 is connected with a cross shaft 174 by means of sprocket chain 176 which rides over a sprocket 178 on the armature shaft of the motor 170 and over a sprocket 180 on the shaft 174. Rotation of the shaft 174 is rendered operative to effect a shifting movement of the carriage 154 through connections which include a pair of sprocket chains 184, 186 which are mounted at opposite sides of the machine and arranged to ride over sprockets on shaft 174 and on a second cross shaft 188 mounted toward the rear of the elevator. Each of the sprocket chains 184 and 186 has the two lower or return legs thereof connected respectively to blocks 190, 192 on the carriage 154. With this arrangement, rotation of the armature shaft of the carriage motor 170 in one or the other direction will cause the carriage to be shifted from one to the other of its package receiving and alternative package discharge positions.

There is provided with the present construction a stripping device which operates during a forward movement of the carriage and platform rollers 156 away from the pallet loading position which holds the group of packages mounted on the rollers 156 against movement and causes them to be dropped onto the pallet 102 or onto the previously tiered layer of such units on the pallet. Details of the stripping device shown form no part of the present invention and are claimed in a co-pending application of Woodcock, Serial No. 541,643 dated December 14, 1956 for Pallet Loading Apparatus. The mechanism will, however, be briefly described in connection with Figs. 1 and 2 of the drawings, as follows:

The illustrated stripping device consists of a stripper rod 200 which is mounted on two parallel arms 202 and 204 which are pivoted respectively on lugs 206 and 208 on the elevator channel irons 106, 108. At their rear ends the arms 202, 204 are connected by means of a cross bar 210. The cross bar 210 is connected at the further side of the apparatus as shown in Figs. 1 and 2 by means of a tie rod 212 with a crank arm 214 mounted on the out-put shaft 216 of a reduction geared motor mounted on the elevator supported cross bar 172.

With the present construction there is provided an automatically controlled gate mechanism which is actuated by a starting button pressed by the operator to permit the advance of a group of packages or similar units from the loading conveyor, generally designated at 220 in Fig. 1 onto the conveyor platform rollers 156. The gate mechanism as generally indicated in Fig. 1, and as shown in greater detail in Figs. 5 and 6, consists of a stop member 222 in the form of an angle iron which extends across the width of the apparatus, having an upwardly extending face adapted to engage with and arrest the forward movement of the packages on the loading conveyor 220, and a bottom rearwardly extending face. At each end, the stop member 222 is rigidly secured to brackets 224, on each of which is carried an upper guide roller 226 and a lower guide roller 228 arranged to ride in a guideway 230, one such guideway 230 being provided in each of the two forward corner uprights of the frame 100. A roller 232 pivotally mounted at its ends in the two brackets 224, extends across the width of the apparatus within the angle provided by the two faces of the L-shaped stop member 222 and with the rolling surface thereof extending somewhat above the top of the stop member 222. The gate consisting of the stop member 222 is normally maintained in a raised stop position by means of two tension springs 234 which are connected between the upright supports and the upper ends of the respective brackets 224. Each bracket 224 is also connected at its lower end to the armature element of a solenoid 236 which acts when energized to draw the stop member 222 downwardly to an inoperative position in which the roller 232 is aligned with the rollers 221 of the loading conveyor and with the platform rollers 156, thus allowing a group of packages held on the loading conveyor to move onto the roller platform comprising rollers 156.

The continued advance of the group of packages or similar units is again arrested when they reach the rearward or unloading edge of the loading conveyor rollers 156 by means of a stop member 238 which extends across the width of the carriage and is provided at each end thereof with a guide block 240 provided with two guide rollers 242 and 244 which are arranged to travel in a guideway 246. Two guideways 246 are provided, one being formed in each of two brackets 248 mounted respectively on the rearward corners of the carriage 154. The up and down position of the guide block 240 and stop member 238 are controlled by means of two identical solenoids 250, each of which is mounted on the associated bracket at each end of the stop member 238. The armature shaft 252 of each solenoid 250 is rigidly connected by a connector 254 to the respective guide block 240. Tension springs 256 connected between the upper ends of the solenoid armatures 252 and supporting pins 258 on the carriage uprights 158 tend to maintain the armatures 252, the tie blocks 240, and the stop member 238 normally in a raised position.

As the group of packages or similar units is moved substantially into position on the platform comprising the rollers 156, the carriage 154 is started moving through a cycle of operations by automatic means hereinafter more fully to be described. As a first step in the operation, the carriage is moved from the loading position A to a position B in which it is located directly over the pallet station. The carriage and the platform comprising rollers 156 then move vertically downwardly to a discharge position in which the group of packages or units is located directly over and a slight distance only above the tiered position in which they will be placed on the pallet 102. The carriage is then moved again horizontally from position C to position D shown in Fig. 1 while, at the same time, the discharge of the packages onto the pallet is effected as the platform rollers 156 are withdrawn with the carriage. Finally, the carriage is again moved upwardly from position D to position A to receive from the loading conveyor another group of packages or units to be tiered on the pallet. This cycle of operations of the carriage and platform mounted thereon, in which the carriage assembly is given a box-like movement from position A to B, to C to D, and then back to A, has been found to have substantial advantages over the operating cycles imparted to such pallet tiering assemblies to be found in the prior art in that the motions of the pallet tiering assembly have been more efficiently laid out for the performance of the several operating functions, and for the application thereto of simple and at the same time effective automatic controls.

In accordance with a feature of the present invention, down movement of the carriage 154 and associated platform driving rollers 156 is controlled by the action of a sensing plate 270 which is mounted beneath and covers substantially the same area as the carriage 154, both widthwise and longitudinally. The sensing plate 270 is supported at each of its four corners by means of identical supporting and actuating assemblies, each of which includes a vertically disposed post 272 which, at its upper end, is slidably supported within a sleeve member 274, and in turn slidably supported on the carriage 154. Down movement of the sleeve member 274 is limited by means of a collar 276 on the sleeve member which engages against an abutting portion of the carriage 154 formed in the upper edge of the aperture for the sleeve member. Down movement of the post 272 is limited by means of a cross pin 278 which passes through the pin 272 and through slots 280 cut in the sides of the sleeve member 274. At its upper end the sleeve member 280 is connected with the armature 282 of a solenoid 284 which operates when energized to move the armature and associated parts, including the sleeve member 274, post 272 and sensing plate 270, to an upward position. Any upward movement of the sensing plate 270 which might be caused by the engagement of an obstruction therewith during the downward movement of the elevator and carriage produces a corresponding upward movement of at least one of the posts 272 and its cross pin 278. At least one of the four Elevator Down Stop, Carriage Reverse Start micro-switches LS-3A, B, C or D is thus actuated by contact with a crosspin 278 to arrest further downward movement of the elevator and carriage to energize all four of the solenoids 284 so that the sensing plate 270 is moved upwardly out of engagement with the previously engaged obstruction, and to start the forward movement of the carriage 154 to the left from the C to the D position shown in Fig. 1.

The operation of the pallet loading apparatus in accordance with an automatic cycle will be briefly described as follows having reference, particularly, to the several micro-switches illustrated in Fig. 1, and the electrical diagram incorporating these switches, together with the carriage, elevator and stripper operating motors, and the sensing plate solenoids.

Figure 10:
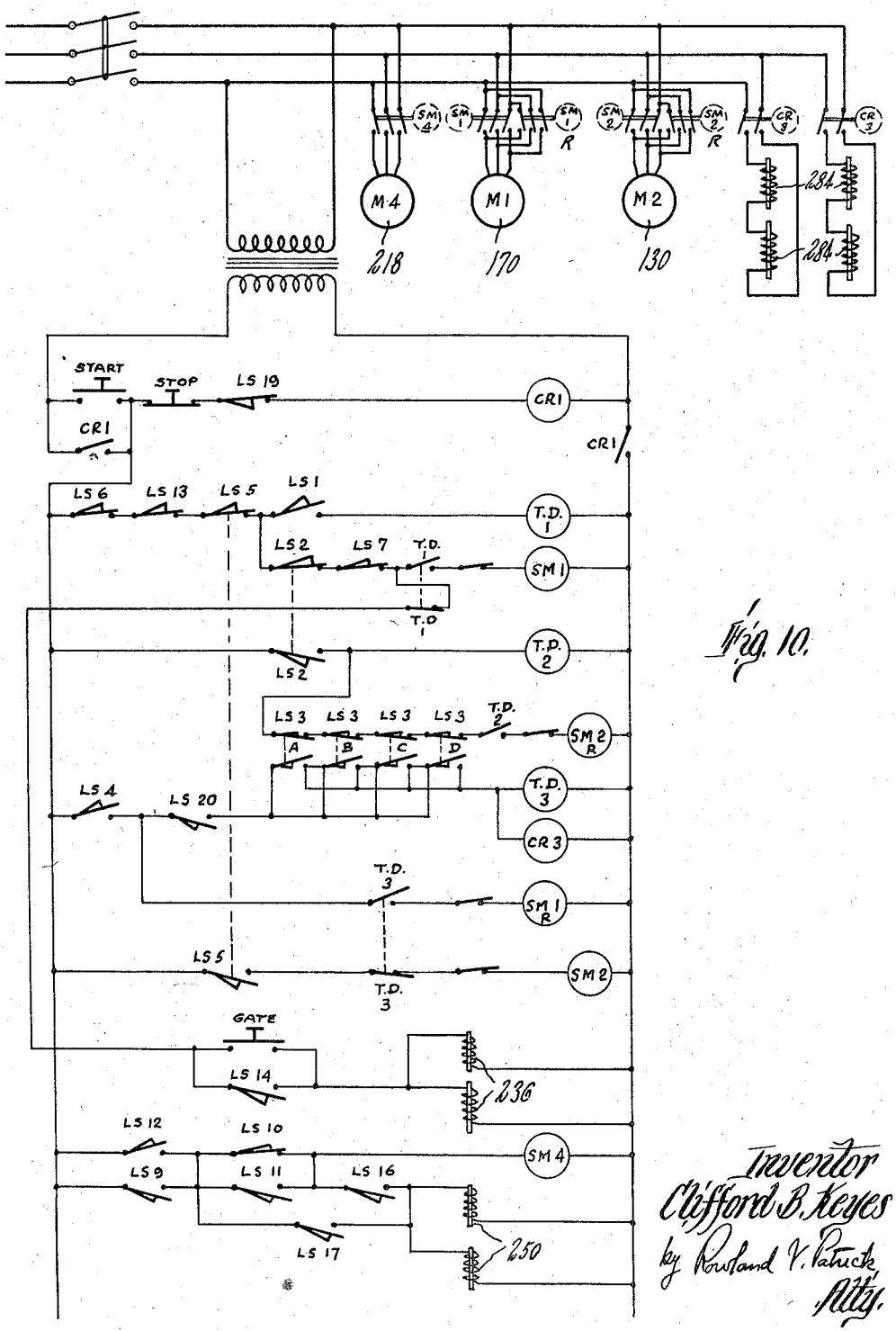
Fig. 10 is an electrical diagram illustrating relevant portions of the electrical circuits for the machine including various switches and relays employed for controlling the operation of the loading apparatus.

The operator will first depress the start button, so marked in Fig. 10, which operates to energize relay CR-1 to close the control circuit. The operator arranges the packages in the required pattern and slides each row of packages making up the group successively down at the gate. The operator then depresses the gate button, so marked in Figs. 1 and 10, thus energizing the gate solenoids 236 causing the gate to be moved downwardly to its inoperative position. The packages are now free to roll onto the carriage and during their rearward advancing movement engage a trip lever 260 which is pivoted on the carriage and operates box detector micro-switch LS-1 on the carriage. A time delay switch TD-1 is then energized and, assuming that the elevator is in its proper loading position, closes the normally open upper limit stop, forward interlock microswitch LS-5.

Time delay switch TD-1 times out causing its contacts to transfer and thus rendering the gate circuit inoperative, and energizing the carriage forward switch relay SM-1.

The carriage 154 now advances, and slightly before it reaches the B position shown in Fig. 1 an abutment 262 on the carriage operates a Carriage Forward Stop and Elevator Down Start micro-switch LS-2, thus deenergizing the carriage motor forward relay SM-1. Movement of the carriage also actuates Stripper Arm Down Start micro-switch LS-9, thus energizing stripper arm motor relay SM-4 which shifts the stripper arm 200 downwardly to its package engaging position. The switch LS-9 is acted upon by a bar 263 mounted on the carriage adjacent the driving chain 184 (see particularly Figs. 1 and 3). The stripper arm motor 218 is stopped upon movement of its driven crank 214 through 180° by engagement with Stripper Arm Down Stop micro-switch LS-10. A normally open contact LS-2 in the circuit with the time delay switch TD-2 closes. When time delay switch TD-2 times out a normally open TD-2 contact in the circuit with the elevator motor down relay SM-2 transfers causing the elevator to descend. It will be understood that the downward movement of the elevator cannot start until the carriage has reached its limit position over the pallet loading station, thus closing control switch LS-2.

The elevator now descends until a normally closed Elevator Down Stop, Carriage Start micro-switch LS-3 forming part of the sensing device is closed by upward movement of one of the sensing plate supporting posts 272.

The closing of any one of the LS-3 switches, A, B, C, or D energizes the time delay relay TD-3 and secondary relay CR-3, thus closing the load circuit to the four sensing plate solenoids 284, and energizing relay SM2R, momentarily plugging the elevator motor 130 to a stop. The time delay switch TD-3 times out transferring normally open contact TD-3 to energize the carriage reverse motor switch relay SM1R. The carriage reverses moving from position C to position D, and is then arrested as Carriage Reverse Stop micro-switch LS-4 is engaged with, and opened by, the movement of the carriage, thus deenergizing the time delay relay TD-3, the secondary relay CR-2, and the carriage motor reverse switch relay SM1R.

Movement of the carriage to its D position also acts to actuate Stripper Arm Up Start micro-switch LS-11 energizing stripper motor switch relay SM-4 which rotates crank arm 214 through another 180°, when the rotation of the motor is again stopped by engagement of the crank arm with Stripper Arm Up Stop micro-switch LS-12, thus deenergizing stripper motor switch SM-4. Normally closed TD-3 contacts in the elevator up SM2R circuit return to the normally closed position. The elevator rises until the normally closed Upper Limit Stop, Forward Interlock micro-switch LS-5 is engaged.

The invention having been described, what is claimed is:

1. In a pallet loading mechanism, a pallet loading station comprising a frame adapted to receive at a low level therein a package supporting pallet, a package supporting elevator vertically shiftable within the frame and overlying said pallet, a platform supported for movement with the elevator downwardly while overlying the pallet to a package stripping position, thence to a position on the elevator displaced laterally from over the pallet to effect the stripping of the packages onto the pallet, thence upwardly with the elevator to a high level package loading position displaced laterally from said pallet, and thence laterally on the elevator over the pallet, a package stripper device including a stripper bar mounted on said elevator for movement between inoperative and package engaging positions for stripping packages from the laterally moving platform, a package loading conveyor positioned for loading packages onto said elevator at a high level, driving means for raising and lowering the elevator, a sensing device responsive to the presence of an obstruction to arrest the lowering of the elevator in successive discharge positions, control means operative with each lowering of the elevator to shift the stripper bar to operative position, means for operating the platform shift device in each of said discharge positions for effecting discharge movement of the platform to discharge packages from the platform onto the pallet, and control means actuated by the discharge movement of the platform for thereafter raising the elevator to said loading position.

2. In a pallet loading mechanism, a pallet loading station comprising a frame adapted to receive at a low level therein a package supporting pallet, a package supporting elevator vertically shiftable within the frame and overlying said pallet, a platform supported for movement with the elevator downwardly while overlying the pallet to a package stripping position, thence to a position on the elevator displaced laterally from over the pallet to effect the stripping of the packages onto the pallet, thence upwardly with the elevator to a high level package loading position displaced laterally from said pallet, and thence laterally on the elevator over the pallet, a package stripper device including a stripper bar mounted on said elevator for movement between inoperative and package engaging positions for stripping packages from the laterally moving platform, a package loading conveyor positioned for loading packages onto said elevator at a high level, driving means for raising and lowering the elevator, means for shifting the stripper bar between operative and inoperative positions, means for operating said platform shift device for depositing packages from the platform onto the pallet, means for controlling the operation of the elevator, the platform shift device, and the package stripper device in a predetermined sequence of operations including a sensing device responsive to an obstruction indicating the approach of the elevator to a limit of downward movement of the elevator in successive discharge positions, means for initiating downward movement of the elevator from the high loading position and for moving said stripper bar to operative position, means responsive to the sensing device to arrest downward movement of the elevator in each of successive discharge positions, and for initiating movement of said platform shift device to strip packages from the platform.

3. In a pallet loading mechanism, a pallet loading station comprising a frame adapted to receive at a low level therein a package supporting pallet, a package supporting elevator vertically shiftable within the frame and overlying said pallet, and a platform supported for movement with the elevator downwardly while overlying the pallet to a package stripping position, thence to a position on the elevator displaced laterally from over the pallet to effect the stripping of the packages onto the pallet, thence upwardly with the elevator to a high level package loading position displaced laterally from said pallet, and thence laterally on the elevator over the pallet, a package stripper comprising a stripper bar mounted on said elevator for movement between inoperative and package engaging positions for stripping packages from the laterally moving platform, a package loading conveyor positioned for loading packages onto said elevator at a high level, driving means for raising and lowering the elevator, means for operating said platform shift device and stripper bar for depositing packages from the platform onto the pallet, a sensing device responsive to an obstruction indicating the downward approach of the elevator to a loading position, and control means acting when rendered operative to initiate a downward movement of the elevator and movement of the stripper bar to package engaging position, means responsive to the operation of the sensing device to arrest the elevator in the selected discharge position, means for operating the platform shift device in each said discharge position, and means responsive to the shift of said platform to initiate upward movement of said elevator to the package loading position.

4. In a pallet loading mechanism, a frame having a high package loading station and a low level pallet supporting station, a package supporting elevator vertically shiftable within the frame and overlying said pallet supporting station, a platform supported for movement with the elevator downwardly while overlying the pallet to a package stripping position, thence to a position on the elevator displaced laterally from over the pallet to effect the stripping of the packages onto the pallet, thence upwardly with the elevator to a high level package loading position displaced laterally from said pallet, and thence laterally on the elevator over the pallet, a sensing plate suspended beneath the elevator overlying the pallet supporting station, driving means for raising and lowering the elevator between said high level package loading station and successively determined low package discharge positions, and a device actuated by movement of the plate relative to the elevator in response to engagement of any obstruction thereberneath to arrest the downward movement of the elevator.

5. In a pallet loading mechanism, a frame having a high package loading station and a low level pallet supporting station, a package supporting elevator vertically shiftable within the frame and overlying said pallet supporting station, a platform supported for movement with the elevator downwardly while overlying the pallet to a package stripping position, thence to a position on the elevator displaced laterally from over the pallet to effect the stripping of the packages onto the pallet, thence upwardly with the elevator to a high level package loading position displaced laterally from said pallet, and thence laterally on the elevator over the pallet, a contact plate located immediately beneath the platform and laterally shiftable with the platform from said package discharge position overlying the pallet supporting station, means for stripping packages from the platform during the lateral displacement thereof, driving means for raising and lowering the elevator between said high level package loading station and successively determined lower pallet loading positions, means for shifting said elevator platform and said contact plate to and from said package supporting position overlying the pallet, and means controlling said driving means and shifting means for loading the pallet including a device responsive to engagement of the plate by any obstruction therebeneath to arrest downward movement of the elevator.

6. In a pallet loading mechanism, a frame having a high package loading station and a low level pallet supporting station, a package supporting elevator vertically shiftable within the frame and overlying the pallet supporting station and an area adjacent thereto comprising said loading station, a platform shiftable laterally on the elevator between a package discharge position overlying a pallet and a package loading position in said area laterally adjacent thereto, means for shifting the platform laterally from one to the other of said positions, means for stripping packages from the platform onto the pallet during a lateral displacement of the platform from the discharge position, driving means for raising and lowering the elevator and platform between said high level package loading station and successively determined lower discharge positions of the platform over the pallet, a sensing plate mounted from the elevator beneath the platform, means supporting the sensing plate from the elevator adapted for shifting said sensing plate between a low sensing position and a raised inoperative position, and control means actuated by any movement of the plate relative to the elevator in response to the engagement of any obstruction therebeneath to arrest downward movement of the elevator, to raise the sensing plate to its inoperative position, and to initiate a shifting movement of the platform from said discharge position.

7. In a pallet loading mechanism, a frame having a high package loading station and a low level pallet supporting station, a package supporting elevator vertically shiftable within the frame and overlying the pallet supporting station and an area adjacent thereto comprising said loading station, a platform supported for movement with the elevator downwardly while overlying the pallet to a package stripping position, thence to a position on the elevator displaced laterally from over the pallet in said area to effect the stripping of the packages onto the pallet, thence upwardly with the elevator to a high level package loading position displaced laterally from said pallet, and thence laterally on the elevator over the pallet, means for stripping packages from the platform onto the pallet during a lateral displacement of the platform from the discharge position, driving means for raising and lowering the elevator and platform between said high level package loading station and successively determined lower discharge positions of the platform over the pallet, a sensing plate mounted from the elevator beneath the platform, a plurality of supporting members for the sensing plate vertically shiftable on the elevator, a solenoid associated with each of the shifting members arranged when deenergized to permit the shifting member to occupy a downward position, and when energized to draw said shifting member to a raised position, a detecting device associated with each supporting member for detecting any upward movement of any said supporting member from the low position, and control means actuated by any said detector device in response to any such upward movement to arrest downward movement of the elevator, to energize each of said solenoids to raise the sensing plate to its inoperative position, and to initiate a shifting movement of the platform from said discharge position.

8. In a pallet loading mechanism, a frame having a high package pallet loading station and a low level package supporting station, an inclined loading conveyor on which packages are guided to said loading station, a platform supported for movement in a rectilinear path downwardly while overlying the pallet station to a package stripping position, thence to a position displaced laterally from over the pallet to effect the stripping of the packages onto the pallet, thence upwardly to a high level package loading station displaced laterally from said pallet, and thence laterally over the pallet, and a plurality of lower package discharge positions overlying the pallet supporting station, means for imparting a lateral discharge movement to the platform from any said package discharge position, means for stripping packages from the platform during said discharge movement of the platform, a gate disposed at said high package loading station shiftable between package restraining and inoperative positions comprising an angle iron extending across the loading conveyor having a vertical package engaging face, a bottom horizontal face and roller supports at each end thereof, a roller supported between the faces of said angle iron and extending somewhat above the vertical face, spring means normally supporting said gate in a raised package engaging position, and control means including solenoids for acting on said roller supports for depressing the gate, driving means for lowering said platform from said package loading station to a discharge position over the pallet supporting station, actuating means for shifting said gate to the inoperative position, for shifting said platform laterally from the discharge position and for actuating said package stripping means, and means controlling said driving means and said actuating means in accordance with an automatic cycle for loading packages onto said pallet.

References Cited in the file of this patent

UNITED STATES PATENTS

| | | |
|---|---|---|
| 2,205,767 | Lamb | June 25, 1940 |
| 2,609,108 | Peterson et al. | Sept. 2, 1952 |
| 2,699,264 | Bruce | Jan. 11, 1955 |
| 2,703,653 | Thomson | Mar. 8, 1955 |